(12) United States Patent
Müller et al.

(10) Patent No.: US 9,803,478 B2
(45) Date of Patent: Oct. 31, 2017

(54) SELF-PROPELLED CONSTRUCTION MACHINE

(71) Applicant: Wirtgen GmbH, Windhagen (DE)

(72) Inventors: René Müller, Vettelschoss (DE); Sebastian Winkels, Windeck (DE); Cyrus Barimani, Konigswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/062,317

(22) Filed: Mar. 7, 2016

(65) Prior Publication Data

US 2016/0265356 A1 Sep. 15, 2016

(30) Foreign Application Priority Data

Mar. 13, 2015 (DE) .................. 10 2015 003 153

(51) Int. Cl.
*E01C 23/088* (2006.01)
*E01C 23/12* (2006.01)
(Continued)

(52) U.S. Cl.
CPC ............ *E21C 35/06* (2013.01); *B60G 17/019* (2013.01); *B60G 17/01908* (2013.01);
(Continued)

(58) Field of Classification Search
CPC ...... E01C 23/088; E01C 23/127; E21C 47/02; B60G 2300/09
(Continued)

(56) References Cited

U.S. PATENT DOCUMENTS 7,530,641 B2    5/2009   Berning et al.
7,828,309 B2   11/2010   Berning et al.
(Continued)

FOREIGN PATENT DOCUMENTS

EP    1860241 A2   11/2007
EP    2722441 A1    4/2014
(Continued)

*Primary Examiner* — David Bagnell
*Assistant Examiner* — Michael Goodwin
(74) *Attorney, Agent, or Firm* — Patterson Intellectual Property Law, PC; Lucian Wayne Beavers; Gary L. Montle

(57) ABSTRACT

The present invention relates to a self-propelled construction machine, in particular a road milling machine, a recycler or a surface miner, comprising a machine frame 1 supported by a chassis 2 which comprises front and rear running gear 3, 4. A working device 5 is arranged on the machine frame 1 and comprises a working roller 17 for working the ground. Lifting devices 15, 16 are associated with the individual running gears 3, 4 and can each be retracted or extended for raising or lowering the running gears with respect to the machine frame. In addition, the construction machine comprises a control unit 20 for actuating the lifting devices 15, 16, which control unit comprises a lifting position measuring device 22 for detecting the lifting position of the lifting devices and a tilt detection device 23 for detecting the tilt of the machine frame 1 transversely to the working direction A of the construction machine. The control unit 20 provides a first mode of operation for working the ground and a second mode of operation for moving the construction machine, and is characterized in that, in the second mode of operation, the lifting devices 15, 16 associated with the individual running gears 3, 4 or wheel are actuated in such a way that the machine frame 1 is substantially levelled transversely to the working direction A of the construction machine, the ground
(Continued)

clearance b preferably being at a maximum or the distance not falling below a minimum distance.

19 Claims, 4 Drawing Sheets

(51) Int. Cl.
    *E21C 35/06*     (2006.01)
    *B60G 17/019*     (2006.01)
    *E21C 25/06*     (2006.01)
    *G05D 1/08*     (2006.01)

(52) U.S. Cl.
    CPC .......... *E01C 23/088* (2013.01); *E01C 23/127* (2013.01); *E21C 25/06* (2013.01); *G05D 1/0891* (2013.01); *B60G 2300/09* (2013.01); *B60G 2400/0511* (2013.01); *B60G 2400/10* (2013.01)

(58) Field of Classification Search
    USPC ...................... 280/5.514, 6.15, 6.153, 6.157
    See application file for complete search history.

(56) References Cited

U.S. PATENT DOCUMENTS

| | | |
|---|---|---|
| 8,118,316 B2 | 2/2012 | Berning et al. |
| 8,424,972 B2 | 4/2013 | Berning et al. |
| 8,998,344 B2 | 4/2015 | Berning et al. |
| 2013/0153310 A1* | 6/2013 | Steffen ................ B62D 55/065 180/9.52 |
| 2013/0162004 A1 | 6/2013 | Killion |
| 2013/0166155 A1 | 6/2013 | Killion |
| 2013/0257136 A1* | 10/2013 | Held .................... E01C 23/088 299/10 |
| 2014/0110990 A1* | 4/2014 | Berning ................ E01C 23/088 299/1.5 |
| 2015/0252539 A1 | 9/2015 | Berning et al. |

FOREIGN PATENT DOCUMENTS

| | | |
|---|---|---|
| WO | 2006094795 A1 | 9/2006 |
| WO | 2008077963 A1 | 7/2008 |

\* cited by examiner

SELF-PROPELLED CONSTRUCTION MACHINE

BACKGROUND OF THE INVENTION

1. Field of the Invention

The present invention relates to a self-propelled construction machine, in particular a road milling machine, a recycler or a surface miner, comprising a machine frame supported by a chassis that comprises front and rear crawler tracks or wheels.

2. Description of the Prior Art

The known construction machines comprise a working device that is arranged on the machine frame and comprises a working roller for working the ground. The working roller can be a milling roller and/or a cutting roller. Road milling machines, for example, comprise a milling roller which can be used to mill away damaged road surfaces.

The individual crawler tracks or wheels of the construction machine are associated with lifting devices that can each be retracted or extended with respect to the machine frame so that the machine frame is lowered or raised, respectively, with respect to the ground surface together with the working device. As a result, the milling depth in a road milling machine can be adjusted. To adjust the milling depth, road milling machines comprise a control unit, by which the lifting devices are actuated to obtain the desired milling profile.

While the ground is being worked, it is desirable for the machine frame, together with the working device, to be exactly level with respect to the ground surface. To adjust the milling depth, the lifting devices can be retracted or extended. During the milling operation, the working roller of the working device is engaged with the ground.

WO 2006/094795 A1 (U.S. Pat. No. 7,828,309) describes a construction machine in which the lifting devices are positively coupled in such a way that the left front crawler track and the right rear crawler track can be adjusted in height in the same direction and can be adjusted in height in the opposite direction towards the right front crawler track and the left rear crawler track. As a result, the transverse and longitudinal tilt of the construction machine is reduced when the machine travels over obstacles, and the stability of the construction machine is increased.

WO 2008/077963 A1 (U.S. Pat. No. 8,424,972) describes a road milling machine comprising a control unit by which the lifting devices are actuated during the milling process in such a way that the machine frame is level in parallel with the ground surface. A road milling machine comprising a controller for levelling the machine frame in parallel with respect to the ground during the milling process is also known from US 2013/0162004 A1.

EP 2 722 441 A1 (U.S. Pat. No. 8,998,344) discloses a road milling machine comprising a control unit for the lifting devices for preventing sideways tipping movements of the construction machine. During the milling process, the control unit is activated such that the milling roller is precisely aligned for the desired milling profile.

Owing to the predefined working width of the working device, relatively large areas can only be worked by the self-propelled construction machines in portions, and so the construction machine has to be moved to the next portion once a previous portion has been worked. It may also be necessary to move the construction machine to a new site in order to be transported. To work the ground, the working roller has to be engaged with the ground, whereas, in order to prevent damage to the machine or to avoid the ground being worked accidentally, the working roller should not be in contact with the ground while the construction machine is being moved. When the construction machine is moved, the individual crawler tracks or wheels cross transitions between milled and unmilled terrain portions. If sudden transitions have to be crossed, the machine frame may tilt sharply to one side.

EP 1 860 241 A2 (U.S. Pat. No. 7,530,641) describes a controller for a road milling machine, which controller is not activated during the milling process of the construction machine, but rather while the machine is being moved, in order to prevent the milling roller engaging with the ground. The controller monitors the distance between the milling roller and the ground in order to decouple the working device from the drive unit and/or to extend the lifting devices if the distance falls below a minimum distance.

US 2013/0166155 A1 also discloses a controller for the operating state of the construction machine, in which the working device is not operational. This controller adjusts different positions of the machine frame of the construction machine. In one of the positions of the machine frame, all the lifting devices are intended to be extended to the same length. In addition, the machine frame is also intended to be aligned with the ground surface. Therefore, if the ground surface is sloped, the machine frame is slanted too.

SUMMARY OF THE INVENTION

The object of the invention is to make it simpler to move the construction machine, to ensure particularly stable operation of the construction machine when the construction machine is being moved, and to improve the driving comfort for the machine operator.

According to the invention, this object is achieved by the features of the independent claims. The dependent claims relate to advantageous embodiments of the invention.

The self-propelled construction machine according to the invention, in particular a road milling machine, recycler or surface miner, comprises a machine frame supported by a chassis which has front and rear running gears, which can comprise crawler tracks or wheels. In the following, running gears are thus understood to be both crawler tracks and wheels.

A working device comprising a working roller for working the ground is arranged on the machine frame. The working roller can be a milling and/or cutting roller. The individual running gears are associated with lifting devices, which can each be retracted or extended for raising or lowering the running gears with respect to the machine frame. As a result, the machine frame is lowered or raised relative to the ground surface. The lifting devices can have various designs. For example, the lifting devices can be piston-cylinder assemblies.

To actuate the lifting devices, the construction machine according to the invention comprises a control unit, which may be a component part of the central controller of the construction machine. The control unit comprises a lifting position measuring device for detecting the lifting position of the lifting devices and a tilt detection device for detecting the tilt of the machine frame transversely to the working direction of the construction machine.

The control unit of the construction machine provides a first mode of operation for working the ground and a second mode of operation for moving the construction machine. In the first mode of operation, the machine frame is in a lowered position in relation to the ground surface, and so the working roller for working the ground is engaged with the ground, whereas in the second mode of operation, the machine frame is in a raised position in relation to the ground surface, in which position the working roller is not engaged with the ground. In this context, moving the construction machine is understood as being any operation for moving the construction machine in which the working device is not intended to be engaged with the ground, i.e. also loading the construction machine in order to be transported or when the construction machine travels to another site. During the moving, however, the working device can remain operational, i.e. the milling roller can still rotate so as to avoid unnecessary start-up operations.

The control unit of the construction machine according to the invention is characterised in that the lifting devices associated with the individual running gears are actuated in such a way that the machine frame is substantially levelled transversely to the working direction of the construction machine, according to both the detected tilt of the machine frame transversely to the working direction of the construction machine and the detected lifting position of the lifting devices. The levelling of the machine frame, even when the contact areas of the running gears are at different heights, not only improves the driving comfort for the machine operator, but also the stability of the construction machine. In addition, the machine operator does not have to control the machine.

The controller according to the invention is advantageous in particular in the case of a road milling machine used to mill away portions of a road surface. The controller according to the invention automatically prevents large tipping movements of the construction machine when said machine is moving, without the machine operator having to take manual action. Therefore, the machine operator can concentrate on the other tasks, in particular monitoring the milling machine conveyor belt, which projects far out, and the vehicles passing by on the construction site.

The controller according to the invention can be implemented in a simple manner in the existing central controller of a construction machine that generally already comprises both lifting position measuring systems for detecting the lifting position of the lifting columns and tilt detection systems.

It is essential to the invention that the tilt of the machine frame transversely to the working direction of the construction machine is monitored in order to raise or lower the corresponding running gear(s), so the machine frame is level transversely to the working direction. In practice, levelling in the transverse direction is much more important than levelling in the longitudinal direction, i.e. in the working direction, for improving driving comfort and stability. It is advantageous, however, if the machine frame is level not only in the transverse direction, but also in the longitudinal direction.

Horizontally levelling the machine frame differs from levelling the machine frame in parallel with the ground surface. It is advantageous for the machine frame to be able to be levelled regardless of the nature of the ground surface. Therefore, the levelling of the machine frame cannot be influenced by the tilt of the ground surface, unevenness or different height levels, for example owing to already milled tracks.

The self-propelled construction machine can comprise a front left running gear and a front right running gear in the working direction and a rear left running gear and a rear right running gear, and a front left and front right lifting device in the working direction and a rear right and rear left lifting device, so that the machine frame can be levelled exactly. The known heavy millers generally have a chassis of this type.

However, it is also possible for the construction machine to only comprise, in the working direction, one front running gear that may be adjustable in height, and one rear left and right running gear that is adjustable in height. Instead of one front running gear, two front running gears can also be provided, which are mounted in a floating manner and form a common front contact point. This embodiment is especially used in small millers, in which the working roller is arranged between the rear running gears and the milling depth can be adjusted precisely simply by controlling the lifting position of the rear running gears. However, the controller according to the invention can also be used in construction machines that comprise two front running gears and one rear running gear.

In the second mode of operation, the machine frame can, for example, be levelled by means of the following actuation of the lifting devices. If for example a left-hand running gear in the working direction travels over an uneven area of ground, the lifting device associated with the opposite right-hand running gear is extended in order to level the machine frame, and if a right-hand running gear travels over an uneven area of ground, the lifting device associated with the opposite left-hand running gear is extended.

The actuation according to the invention of the lifting devices differs from a positive coupling of lifting devices, as known for example from WO 2006/094795 A1 (U.S. Pat. No. 7,828,309). In the case of the single swing axle having two positively coupled chassis, for example, the height change is "distributed" to the lifting columns involved, i.e. when the left-hand lifting column travels over an uneven area, the left-hand lifting column is retracted and the right-hand lifting column is extended by the same amount. As a result, the distance between the machine frame and the ground surface is inevitably reduced on the left-hand side. In the actuation according to the invention of the lifting devices, however, the distance between the machine frame and the ground remains the same on the left-hand side and only increases on the right-hand side. The swing axle can then only hold the construction machine in the horizontal if the machine has already been levelled beforehand. If the swing axle is activated when the machine is tilted, the axle retains this tilt even when travelling over uneven areas.

In order to specify the first and second modes of operation or to switch between the two modes of operation, an input unit is preferably provided, which can be designed in different ways and be arranged on the operator's platform, for example can comprise a control panel having buttons or switches.

In a particularly preferred embodiment, the control unit is configured in the second mode of operation such that the lifting devices associated with the individual running gears are actuated in such a way that at least one lifting device assumes a predefined lifting position in which the lifting device is extended by a predefined distance. The predefined lifting position of the at least one lifting device is preferably a lifting position in which the lifting device is completely or almost completely extended. This ensures that the distance between the lower edge of the working roller and the ground surface is at a maximum, and so there is no possibility of the working roller getting caught on the ground. However, it is also possible to specify a position below the upper end position of the lifting device.

The tilt detection device comprises at least one tilt sensor arranged on the machine frame. To detect the transverse tilt, one tilt sensor arranged on the machine frame in the transverse direction is sufficient. To detect the transverse and longitudinal tilt, one tilt sensor can be arranged on the machine frame in the transverse direction and one tilt sensor can be arranged on the machine frame in the longitudinal direction, or one single sensor can be provided that detects both the transverse and the longitudinal tilt. A plurality of tilt sensors can also be provided at different reference points on the machine frame, an average value being formed from the measured values from the individual sensors.

The control unit is preferably configured such that, following switching from the first mode of operation to the second mode of operation and before the construction machine is moved, initially at least one lifting device arranged on the left-hand side in the working direction or at least one lifting device arranged on the right-hand side of the construction machine in the working direction, i.e. the relevant lifting device that counteracts the tilt, is extended so far as to substantially level the machine frame transversely to the working direction. In a construction machine having two front and rear running gears, preferably both the relevant front and rear running gear are extended. Only when the machine frame is level are all the lifting devices extended until one of the lifting devices assumes the predefined lifting position, i.e. generally the lifting device out of all the lifting devices that has been extended previously by the greatest distance in order to level the machine. As a result, the distance between the milling roller and the ground is at a maximum or is at least greater than a predefined minimum distance. In this controller, the construction machine is raised further in order to increase the ground clearance when level. However, it is also possible to first raise the construction machine to increase the ground clearance and to only then level the machine. A step of raising the machine frame by a predefined distance can also precede the step of levelling the machine frame, in order to first raise the working roller by only a small amount and to then level the construction machine and afterwards increase the ground clearance.

When the construction machine has the required ground clearance, the construction machine can be moved. Once the ground clearance is sufficient, the machine operator can activate the running gears to move the construction machine. During the moving, the tilt of the machine frame transversely to the working direction is continuously monitored. If a tilt of the machine frame is detected, for example owing to one of the running gears crossing a milling edge, the levelling of the machine frame is corrected by retracting or extending the relevant lifting device. Preferably, the correction is carried out by extending the relevant at least one lifting device arranged on the left-hand side in the working direction or the relevant at least one lifting device arranged on the right-hand side of the construction machine in the working direction. However, this is only possible if the relevant lifting device has not yet assumed the predefined lifting position, i.e. is not yet in the upper end position.

If the relevant left-hand or right-hand lifting device does not assume the predefined lifting position when the construction machine is tilted transversely to the working direction, the lifting device is extended until the machine frame is substantially level in the transverse direction. As a result, the ground clearance cannot decrease. However, the lifting device is only extended unless the predefined lifting position has been reached. If the relevant lifting device has assumed the predefined lifting position, the corresponding opposite lifting device is retracted until the machine frame is level in the transverse direction.

If at least one lifting device is retracted, as a result of which the ground clearance decreases, one preferred embodiment ensures that the working roller does not strike the ground. In this embodiment, the control unit comprises a distance measuring device for detecting the distance between the working roller and the ground surface. The control unit is also configured such that, while the construction machine is being moved, if the construction machine is tilted transversely to the working direction and if the left-hand or right-hand lifting device assumes the predefined lifting position, i.e. has already reached the end position, the corresponding opposite lifting device is only retracted if the distance between the working roller and the ground surface is not below a predefined minimum distance or is only retracted to the extent that the distance between the working roller and the ground surface does not fall below a predefined minimum distance. In this case, the machine frame is not levelled, but potential damage to the working device is prevented.

The distance measuring device for detecting the distance between the working roller and the ground can be designed in different ways. The distance between the lower edge of the milling roller and the ground surface can, for example, be measured directly by one or more distance sensors, which can be contact sensors or contactless sensors, for example infrared or ultrasonic distance sensors. However, the distance can also be detected indirectly by determining the position of parts of the construction machine that are movably attached to the machine frame and rest on the ground. For example, the height of the working roller arranged on the machine frame with respect to the ground can be calculated from the height, measured in relation to the machine frame, of the side edge protector and/or of the pressure pad arranged in front of the working roller in the working direction and/or of the wiper device of the construction machine arranged behind the working roller. Systems of this type are known, for example, from WO 2008/077963 A1 (U.S. Pat. No. 8,424,972). This is advantageous in that the controller according to the invention can make use of components that are already present on the construction machine. More preferably, the distance of the milling roller from the ground surface can be determined from the known lifting position of the lifting devices and from the known position of the milling roller on the machine frame.

BRIEF DESCRIPTION OF THE DRAWINGS

In the following, an embodiment of the invention will be described in more detail with reference to the drawings, in which.

DETAILED DESCRIPTION

Figure 1:
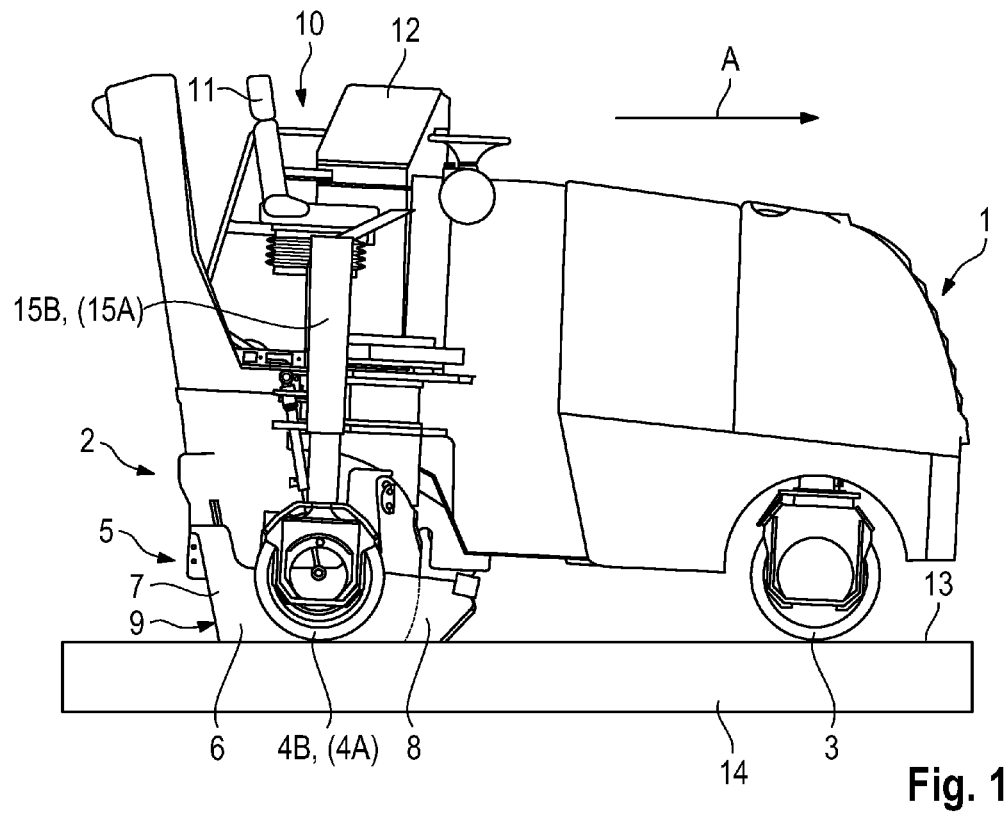
FIG. 1 is a side view of a first embodiment of a self-propelled construction machine.
Figure 3:
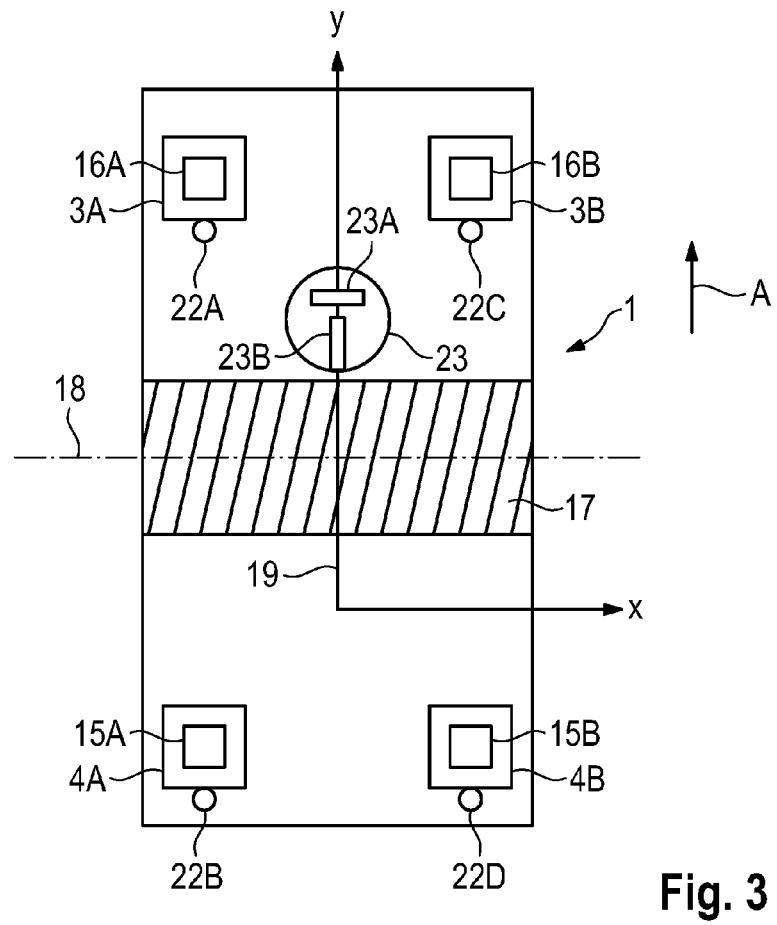
FIG. 3 is a simplified, schematic view of the machine frame of the construction machine of FIG. 2, together with the lifting devices and the running gears.

FIG. 1 is a side view of a first embodiment of a road milling machine, which is a small miller. The road milling machine comprises a machine frame 1 which is supported by a chassis 2. The chassis 2 has a front wheel 3 in the working direction A and two rear wheels 4A, 4B (FIG. 3).

The milling machine comprises a working device 5 which is arranged on the machine frame 1. The working device 5 comprises a working roller, which is in the form of a milling roller. The milling roller 17 (not visible in FIG. 1) is arranged in a milling roller housing 6. The milling roller housing 6 is closed on the left-hand and right-hand side in the working direction A by an edge protector 7. The milling roller housing 6 is closed at the front side in the working direction A by a pressure pad 8 and at the rear side by a wiper device 9, which is hidden by the edge protector 7 in the view in FIG. 1. Above the milling roller housing 6 is the operator's platform 10 containing the operator's seat 11 and the control panel 12.

The height of the machine frame 1 of the construction machine is adjustable in relation to the surface 13 of the ground 14. The device for adjusting the height of the machine frame comprises a left rear lifting device 15A in the working direction A and a right rear lifting device 15B, which support the machine frame. The left-hand lifting device 15A is attached to the left-hand running gear 4A and the right-hand lifting device 15B is attached to the right-hand running gear 4B. When the running gears are resting on the ground 14, the machine frame 1 can be lowered and raised by retracting and extending the lifting devices. Since the working device 5 is arranged on the machine frame 1, the height of the working roller above the surface of the terrain, and the milling depth during milling operation, can be adjusted by adjusting the height of the machine frame. By adjusting the height of the machine frame 1, the position of the edge protector 7, which floatingly rests on the ground, the pressure pad 8 and the wiper device 9, which are movably arranged on the machine frame 1, is also adjusted relative to the machine frame 1. A lifting device can also be associated with the front running gear 3. Instead of a front running gear, it is also possible to provide two front running gears that are floatingly mounted and form a common contact point.

Figure 2:
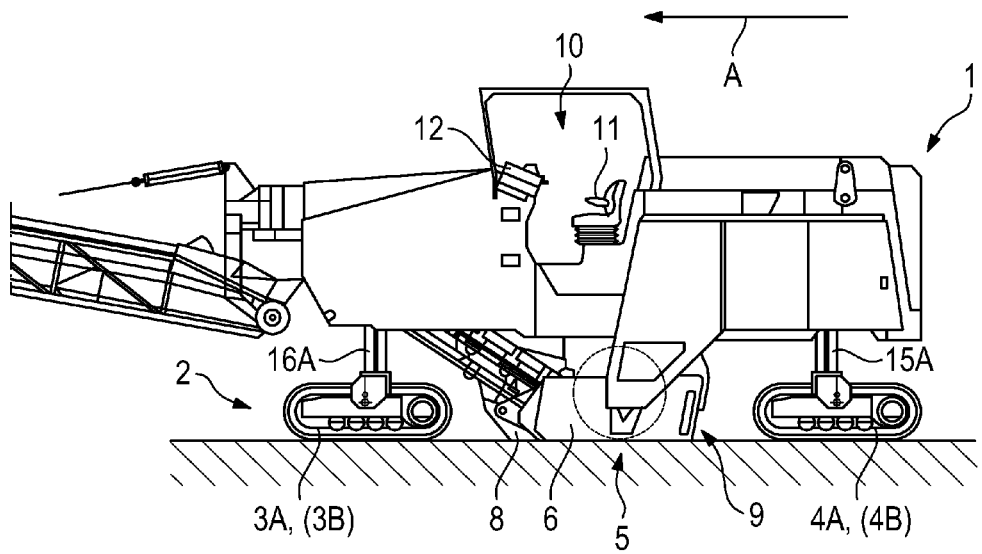
FIG. 2 is a side view of a second embodiment of a self-propelled construction machine.

FIG. 2 shows a second embodiment of a road milling machine, which is a heavy miller. In the working direction A, the heavy miller comprises a front left running gear 3A and a front right running gear 3B and a rear left running gear 4A and a rear right running gear 4B, and a front left and front right lifting device 16A, 16B in the working direction A and a rear right and rear left lifting device 15A, 15B, and so it is possible to level the machine using both the two front lifting devices and the two rear lifting devices (FIG. 3). The parts of the heavy miller that correspond to the parts of the small miller from FIG. 1 are provided with the same reference numerals in FIG. 2.

FIG. 3 is a simplified, schematic view of the machine frame 1 of the construction machine from FIG. 2, having the front and rear running gears and the lifting devices associated with the running gears. The working roller 17 of the working device 5 is arranged on the machine frame 1 between the front and rear running gears. During the milling process, the front running gears 3A, 3B rest on the ground that has not yet been milled in front of the milling roller, while the rear running gears 4A, 4B rest on the milled ground, i.e. in the milled track. FIG. 3 shows a reference plane of the machine frame located in the x/y plane of the Cartesian coordinate system 19. The working roller 17 rotates about an axis of rotation 18, which extends in parallel with the x-axis of the coordinate system 19.

Figure 4:
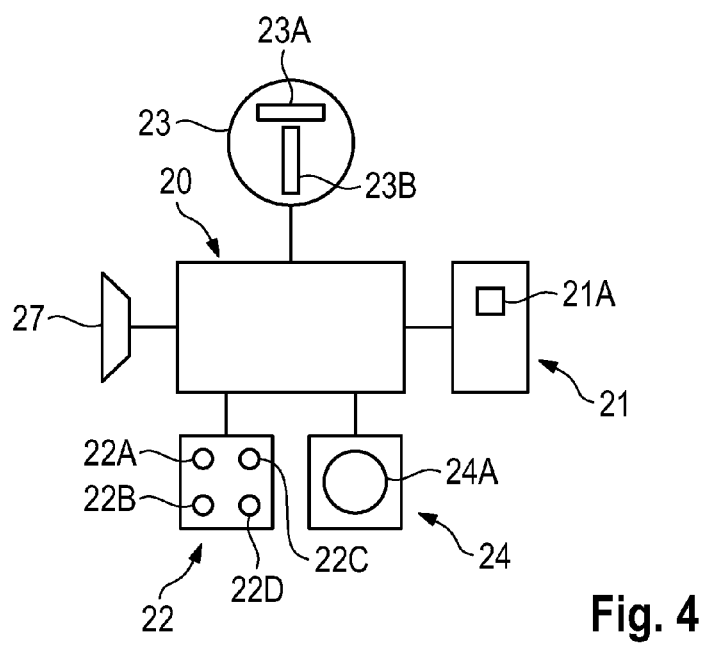
FIG. 4 is a block diagram of the control unit of the construction machine.

In the embodiment, the lifting devices are piston-cylinder assemblies that are hydraulically operated. To actuate the lifting devices, the construction machine comprises a control unit 20, which can comprise a data processing unit on which a data processing program (software) runs. The controller provides a first mode of operation for working the ground and a second mode of operation for moving the construction machine. By operating an operation element 21A on an input unit 21, for example by operating a button or a switch on the control panel 12 on the operator's platform 10, the machine operator can select one mode of operation or the other (FIG. 4).

In the first mode of operation, the control unit 20 actuates the lifting devices 15, 16 such that the machine frame 1 is in a lowered position with respect to the ground surface, in which position the working roller 17 is engaged with the ground. In this position, the lifting devices are actuated to adjust the desired milling depth. The first mode of operation represents the actual milling operation. In the second mode of operation, the machine frame 1 is intended to be in a raised position with respect to the ground surface, and so the working roller 17 is not with the ground. This mode of operation is only intended for moving the construction machine.

The control unit 20 comprises a lifting position measuring device 22 for detecting the lifting position of the lifting devices 15, 16, a tilt detection device 23 and a distance measuring device 24 for detecting the distance between the working roller 17 and the ground surface 13.

The lifting position measuring device 22 comprises sensors 22A to 22D associated with the individual lifting devices 15, 16, for example cable sensors, by which the lifting position of the individual lifting columns is detected. The lifting position measuring device 22 can also comprise just one sensor for each lifting device, said sensor detecting a defined lifting position, in particular an end position of the individual lifting devices, i.e. whether the lifting devices are completely or almost completely extended or retracted. The distance measuring device 24 for detecting the distance between the working roller 17 and the ground surface 14 can, for example, comprise one or more infrared or ultrasonic distance sensors 24A. However, the distance can also be determined by detecting the position of the edge protector 7 and/or of the pressure pad 8 and/or of the wiper device 9 of the construction machine.

The tilt detection device 23 comprises a tilt sensor 23A, which is designed such that the tilt of the machine frame 1 transversely to the working direction A of the construction machine is detected, i.e. a tipping movement about the y-axis or an axis parallel to the y-axis. The tilt detection device 23 can also comprise an additional tilt sensor 23B, which is designed such that that the tilt of the machine frame in the longitudinal direction of the construction machine is detected, i.e. a tipping movement about the x-axis or an axis parallel to the x-axis.

The control unit 20 analyses the measured values (data or signals) from the lifting position measuring device 22, the measured values from the tilt detection device 23 and from the distance measuring device 24, and data (signals) from the input unit 21, and generates data (signals) for actuating a hydraulic unit (not shown) of the construction machine, by which the piston-cylinder assemblies are operated. The control unit 20 is configured such that the method steps described below are carried out.

Figure 5A:
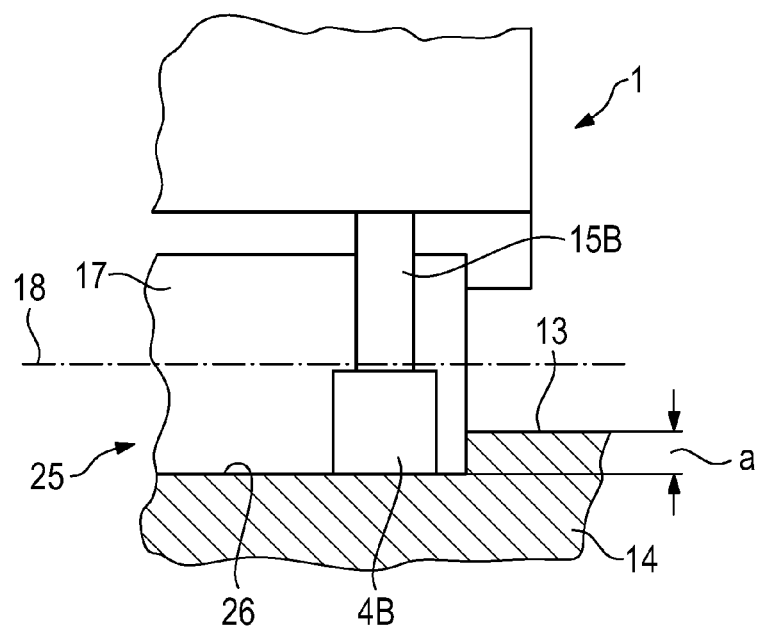
FIG. 5A is a simplified, schematic view of a lifting device of a running gear, together with the working roller, before the machine frame is levelled.

In the embodiment described below, the tilt of the machine frame 1 is only evened out in the transverse direction. First, it is assumed that the construction machine is still in the first mode of operation. This case is shown in FIG. 5A, which shows a part of the machine frame 1 of the construction machine, the working roller 17 arranged on the machine frame, and a running gear 4B of the construction machine, together with the lifting device 15B. The milling roller 17 is engaged with the ground 14, the front running gears resting on the unmilled ground and the rear running gears resting on the bottom 26 of the milled track 25, which has a milling depth a. After the milled track 25 has been milled, the construction machine is to be moved to mill a new milled track parallel to the old milled track. For this purpose, the machine can, for example, be moved diagonally backwards so as to reach the beginning of the parallel second milled track. In this case, the individual running gears 3, 4 cross the sudden transitions between the milled and unmilled portions of terrain.

Figure 5B:
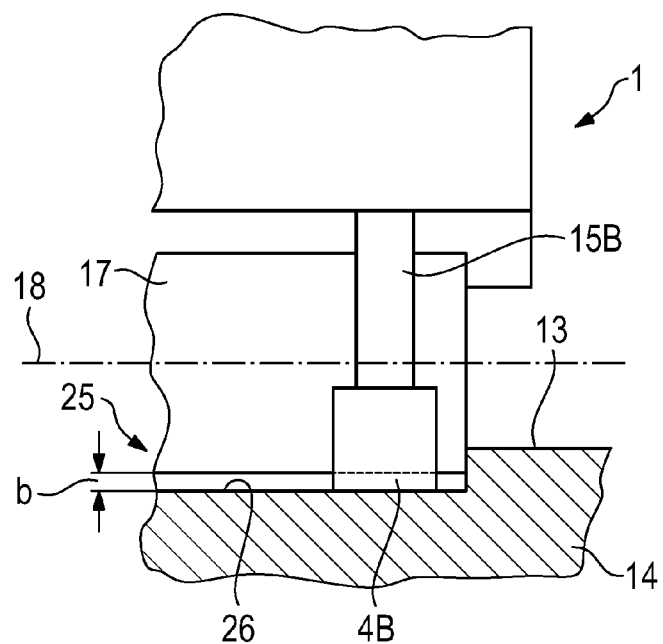
FIG. 5B is a view of a lifting device of a running gear, together with the working roller, after the machine frame has been levelled.

If the machine operator specifies the second mode of operation, the control unit 20 first checks whether the machine frame 1 is level in the transverse direction. This is the case when the machine frame 1 has been levelled in the first mode of operation (FIG. 5A). However, the construction machine can also be in a slanted position relative to the horizontal. In this case, the control unit 20 actuates the relevant lifting device(s) in such a way that the machine frame is levelled transversely to the working direction A. If the machine frame 1 is tilted to the right, for example, the right-hand front and rear lifting devices 16B, 15B are extended until the tilt detection device 23 establishes that the machine frame 1 is level in the transverse direction. Since the lifting devices are extended, the distance b between the lower edge of the working roller 17 and the bottom 26 of the milled area increases, especially on the right-hand side. FIG. 5B shows the lifting position of the lifting device 15B, and the milling roller 17 in the slightly raised position, in which case the machine frame 1 is level.

Figure 5C:
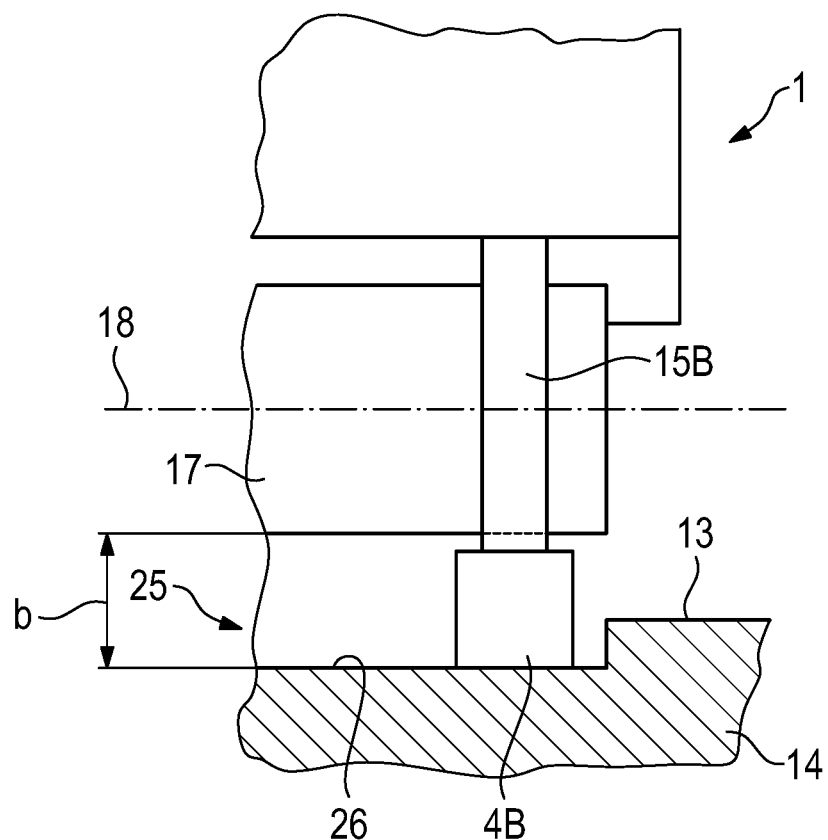
FIG. 5C is a view of a lifting device of a running gear, together with the working roller, the machine frame being raised to increase the ground clearance.

Once the machine frame 1 is level, the control unit 20 actuates the lifting devices 15, 16 in such a way that all the lifting devices are extended. While the lifting devices 15, 16 are being extended, the control unit 20 monitors the lifting positions of the lifting devices. The control unit 20 compares the lifting position of all the lifting devices 15, 16 with a predefined lifting position that corresponds to an upper end position. The upper end position is preferably a lifting position in which the relevant lifting device is completely or almost completely extended. When one of the lifting devices has assumed the lifting position that corresponds to the predefined lifting position, the control unit stops the extension operation for all the lifting devices. The machine is then level, the working roller 17 being at a safe distance b from the bottom 26 of the milled area, and so the construction machine can be moved without the risk of damage to the working roller (FIG. 5C).

During the moving, the control unit 20 continuously receives the measured values (data, signals) from the tilt detection device 23, the control unit continuously checking the tilt of the construction machine in the transverse direction (step 1). If the construction machine travels diagonally backwards towards the left, for example, the rear left running gear 4A is the first to cross the sudden transition between the milled and unmilled portion, as a result of which the construction machine begins to tip to the right. In the event of a predefined deviation from the horizontal, the control unit 20 first determines which lifting devices 15, 16 have to be extended to produce levelling. In the present case, the front left and right lifting devices 16A, 15A and the right rear lifting device 15B are extended. After this, the control unit 20 checks whether one lifting device of the relevant lifting devices that have to be extended is already in the predefined end position (step 2). If this is not the case, the relevant lifting devices are extended (step 3). Otherwise, the relevant lifting device cannot be extended any further. In this case, the construction machine can only be levelled by retracting one or more lifting devices. The control device determines which lifting devices 15, 16 have to be retracted to produce levelling. In the present case, the left rear lifting device 15A has to be retracted since the running gear 4A rests on the unmilled ground. Before the relevant lifting device(s) are retracted, the control unit 20, which receives the measured values from the distance measuring device 24 for measuring the distance b between the lower edge of the working roller 17 and the ground surface 14, checks whether the measured distance b has not dropped below a predefined minimum distance resulting in a risk of the working roller getting caught on the ground (step 4). If the distance falls below the minimum distance, the construction machine is not levelled, so as to prevent the milling roller from coming into contact with the ground. In this case, the control unit 20 can generate an alarm signal for an alarm unit 27, which can be arranged on the operator's platform 10, in order to alert the machine operator about this operating state by means of an acoustic and/or optical alarm. However, if the distance b is greater than the minimum distance, the relevant lifting device(s) 15, 16 is/are retracted until the machine frame 1 is level in the transverse direction (step 5). If the distance b is sufficient, the left rear lifting device 4A is retracted in this case.

If only the left rear lifting device 4A is retracted, the machine frame is levelled in both the transverse and longitudinal direction. However, it is also possible for the left-hand front and rear lifting devices to be retracted together, so that levelling is only carried out in the transverse direction.

While the individual lifting devices 15, 16 are being retracted or extended, the control unit 20 continuously monitors the reaction of the construction machine to the movement of the lifting devices 15, 16. The control unit 20 checks whether the tilt of the machine changes while the individual lifting devices are being retracted or extended (step 6). If a change in tilt is not detected, the control unit 20 decides that there is an unstable state (step 6). Checking the tilt of the machine frame can also include a plausibility check, in that a check is carried out as to whether a tipping movement to the left takes place during extension of the right-hand running gears or if a tipping movement to the right takes place during extension of the left-hand running gears. The plausibility check can take place similarly when the relevant running gears are retracted.

In a construction machine comprising two front and rear, left and right running gears or wheels, the control unit 20 can for example also assume that there is an unstable state if the construction machine rests on the ground by just three running gears or wheels, i.e. one running gear is no longer in contact with the ground, and so the construction machine may tip to one side. In this case, retracting the relevant lifting device further will not lead to a change in the tilt of the machine frame, as is recognised by the control unit. The control unit 20 then stops the automatic control (step 7). In this case too, the control unit 20 can generate an alarm signal for the alarm unit 27.

In a construction machine comprising just one front wheel 3 arranged centrally on the machine frame 1, for example in the small miller shown in FIG. 1, only the lifting devices 16A, 16B associated with the rear running gears 4A, 4B or wheels are extended or retracted in order to level the machine frame 1 in the transverse direction. However, the small miller can also comprise two front wheels which, by being floatingly mounted, form just one contact point. In construction machines of this type too, only the rear lifting devices are extended or retracted for levelling the machine frame.

If the tilt detection device 23 is designed such that the tilt in both the transverse and the longitudinal direction of the machine frame 1 is detected, the machine frame can be levelled not only in the transverse direction but also in the longitudinal direction.

In an alternative embodiment of the invention, the control unit 20 determines the relevant lifting devices 15, 16 that can be used to counteract a tilt of the machine frame by being extended or retracted, and said unit actuates these devices such that the machine frame is levelled in the transverse and longitudinal direction, the ground clearance being at a maximum or not dropping below a minimum distance. The relevant lifting devices 15, 16 for levelling in the longitudinal direction are actuated similarly to the relevant lifting devices for levelling in the transverse direction. For this purpose, the machine frame can in particular first be levelled in the transverse direction and then levelled in the longitudinal direction.

The invention claimed is:

1. A self-propelled construction machine having a working direction, the machine comprising:
   a machine frame;
   front and rear running gears for supporting the machine frame from a ground surface;
   a working roller arranged on the machine frame for working the ground surface;
   a plurality of lifting columns, each lifting column being associated with one of the running gears and configured to be retracted or extended for raising or lowering the associated running gear with respect to the machine frame so that the machine frame is lowered or raised with respect to the ground surface;
   a plurality of lifting position measuring sensors, each lifting position measuring sensor being associated with one of the lifting columns and configured to detect a lifting position of the associated lifting column;
   one or more tilt sensors configured to detect tilting of the machine frame transversely and longitudinally to the working direction of the construction machine; and
   a controller operably associated with the sensors and the lifting columns, and configured to actuate the lifting columns, the controller being configured to provide a first mode of operation for working the ground surface, the machine frame being in a lowered position with respect to the ground surface with the working roller engaged with the ground surface when in the first mode of operation; and
   the controller being configured to provide a second mode of operation for moving the construction machine, the machine frame being in a raised position with respect to the ground surface with the working roller not engaged with the ground surface when in the second mode of operation, and
   the controller being configured such that the lifting columns associated with the running gears are actuated in such a way that the machine frame is substantially horizontally levelled in response to both the detected tilting of the machine frame at least transversely to the working direction and the detected lifting positions of the lifting columns.

2. The self-propelled construction machine of claim 1, wherein:
   the controller is configured such that in the second mode of operation the lifting columns associated with the running gears are actuated such that at least one lifting column assumes a predefined lifting position in which the at least one lifting column is extended by a predefined distance.

3. The self-propelled construction machine of claim 2, wherein:
   the controller is configured such that in the second mode of operation the predefined lifting position of the at least one lifting column is a lifting position in which the at least one lifting column is completely extended.

4. The self-propelled construction machine of claim 1, wherein:
   the tilt sensor is arranged on the machine frame.

5. The self-propelled construction machine of claim 1, wherein:
   the front and rear running gears include a front left running gear, a front right running gear, a rear left running gear and a rear right running gear; and
   the plurality of lifting columns includes a front left lifting column and a front right lifting column.

6. The self-propelled construction machine of claim 1, wherein:
   the front and rear running gears include at least one front running gear, a rear left running gear and a rear right running gear; and
   the plurality of lifting columns includes a rear left lifting column and a rear right lifting column.

7. The self-propelled construction machine of claim 1, wherein:
   the controller is configured such that following switching from the first mode of operation to the second mode of operation and before the construction machine is moved, a check is carried out as to whether the machine frame is tilted transversely to the working direction, and if the machine frame is tilted transversely to the working direction at least one lifting column arranged on a left-hand side of the construction machine or at least one lifting column arranged on a right-hand side of the construction machine is extended until the machine frame is substantially horizontally levelled transversely to the working direction.

8. The self-propelled construction machine of claim 7, wherein:
   the controller is configured such that after the at least one lifting column arranged on the left-hand side of the construction machine or the at least one lifting column arranged on the right-hand side of the construction machine is extended, all of the lifting columns are extended until at least one of the lifting columns assumes a predefined lifting position in which the at least one of the lifting columns is extended by a predefined distance.

9. The self-propelled construction machine of claim 8, wherein:

the controller is configured such that, while the construction machine is being moved, in the event that the machine frame is tilted transversely to the working direction:
at least one lifting column not assuming the predefined lifting position and arranged on the left-hand side in the working direction or at least one lifting column not assuming the predefined lifting position and arranged on the right-hand side of the construction machine in the working direction is extended until the machine frame is substantially horizontally levelled transversely to the working direction; or
at least one lifting column assuming the predefined lifting position and arranged on the left-hand side in the working direction or at least one lifting column assuming the predefined lifting position and arranged on the right-hand side of the construction machine in the working direction is retracted until the machine frame is substantially horizontally levelled transversely to the working direction.

10. The self-propelled construction machine of claim 9, wherein:
the controller includes a distance measuring sensor configured to detect a distance between the working roller and the ground surface; and
the controller is configured such that while the construction machine is being moved, if the machine frame is tilted transversely to the working direction and if the left-hand or right-hand lifting column assumes the predefined lifting position, the lifting column is only retracted if the distance between the working roller and the ground surface does not fall below a predefined minimum distance.

11. The self-propelled construction machine of claim 1, wherein:
the tilt sensor is configured to also detect tilting of the machine frame in the working direction of the construction machine; and
the controller is configured in the second mode of operation such that the lifting columns associated with the running gears are actuated such that the machine frame is substantially horizontally levelled in response to the detected tilting of the machine frame transversely to the working direction and in the working direction of the construction machine, and in response to the detected lifting positions of the lifting columns.

12. A method of operating a self-propelled construction machine, the construction machine including a machine frame, front and rear running gears for supporting the machine frame from a ground surface, a working roller arranged on the machine frame for working the ground surface, a plurality of lifting columns, each lifting column being associated with one of the running gears and configured to be retracted or extended for raising or lowering the associated running gear with respect to the machine frame so that the machine frame is lowered or raised with respect to the ground surface, and a control unit operably associated with the lifting columns and configured to actuate the lifting columns, the method comprising steps of:
in a first mode of operation working the ground surface with the machine frame in a lowered position with respect to the ground surface and with the working roller engaged with the ground surface; and
in a second mode of operation raising the machine frame to a raised position with respect to the ground surface wherein the working roller is not engaged with the ground surface, and in the second mode of operation:
detecting tilting of the machine frame transversely to a working direction;
detecting tilting of the machine frame longitudinally to the working direction;
detecting a lifting position of each of the lifting columns; and
actuating the lifting columns associated with the running gears by operation of the control unit such that the machine frame is substantially horizontally levelled in response to both the detected tilting of the machine frame at least transversely to the working direction and the detected lifting positions of the lifting columns.

13. The method of claim 12, further comprising:
in the second mode of operation, moving at least one of the lifting columns such that the at least one lifting column assumes a predefined lifting position in which the at least one lifting column is extended by a predefined distance.

14. The method of claim 13, wherein:
in the predefined lifting position the at least one lifting column is completely extended.

15. The method of claim 12, further comprising:
switching from the first mode of operation to the second mode of operation; and before the construction machine is moved, checking as to whether the machine frame is tilted transversely to the working direction; and
if the machine frame is tilted transversely to the working direction, extending at least one lifting column arranged on a left-hand side of the construction machine or at least one lifting column arranged on a right-hand side of the construction machine until the machine frame is substantially horizontally levelled transversely to the working direction.

16. The method of claim 15, further comprising:
after extending the at least one lifting column arranged on a left-hand side of the construction machine or the at least one lifting column arranged on a right-hand side of the construction machine until the machine frame is substantially horizontally levelled transversely to the machine frame, extending all of the lifting columns until at least one of the lifting columns assumes a predefined lifting position in which the at least one lifting column is extended by a predefined distance.

17. The method of claim 16, further comprising:
in the second mode of operation, moving the construction machine across the ground surface and in the event that the machine frame is tilted transversely to the working direction while moving the construction machine across the ground surface:
extending at least one lifting column not assuming the predefined lifting condition and arranged on the left-hand side or at least one lifting column not assuming the predefined lifting condition and arranged on the right-hand side, until the machine frame is substantially horizontally levelled transversely to the working direction; or
retracting at least one lifting column assuming the predefined lifting condition and arranged on the left-hand side or at least one lifting column assuming the predefined lifting condition and arranged on the right-hand side, until the machine frame is substantially horizontally levelled transversely to the working direction.

18. The method of claim 17, further comprising:
measuring a distance between the working roller and the ground surface; and performing the retracting step only if the distance between the working roller and the ground surface does not fall below a predefined minimum distance.

19. The method of claim 12, further comprising:

in the second mode of operation detecting tilting of the machine frame in the working direction; and the actuating step is further characterized as actuating the lifting columns associated with the running gears by operation of the control unit such that the machine frame is substantially horizontally levelled in response to the detected tilting of the machine frame transversely to the working direction and in the working direction and the detected lifting positions of the lifting columns.

\* \* \* \* \*